Feb. 24, 1931.   W. C. SHERWOOD   1,794,254
LEVELING INSTRUMENT
Filed Dec. 4, 1928

Inventor
W. C. Sherwood
By Lacey Lacey, Attorneys

Patented Feb. 24, 1931

1,794,254

UNITED STATES PATENT OFFICE

WALTER C. SHERWOOD, OF MOULTRIE, GEORGIA

LEVELING INSTRUMENT

Application filed December 4, 1928. Serial No. 323,611.

The present invention is directed to improvements in leveling instruments.

The primary object of the invention is to provide an instrument of this character so constructed that it can be used in a horizontal, inclined or perpendicular position.

Another object of the invention is to provide an instrument of this class so constructed that it can be conveniently used for leveling and paralleling shafts or pipes, leveling various flat surfaces, plumbing pipes, and various shafts and pipes.

Another object of the invention is to provide an instrument of this character capable of being detachably secured to the object during leveling or plumbing thereof.

With these and other objects in view, this invention resides in the novel features of construction, formation, combination and arrangement of parts to be hereinafter more fully described, claimed and illustrated in the accompanying drawing, in which:—

Figure 1:
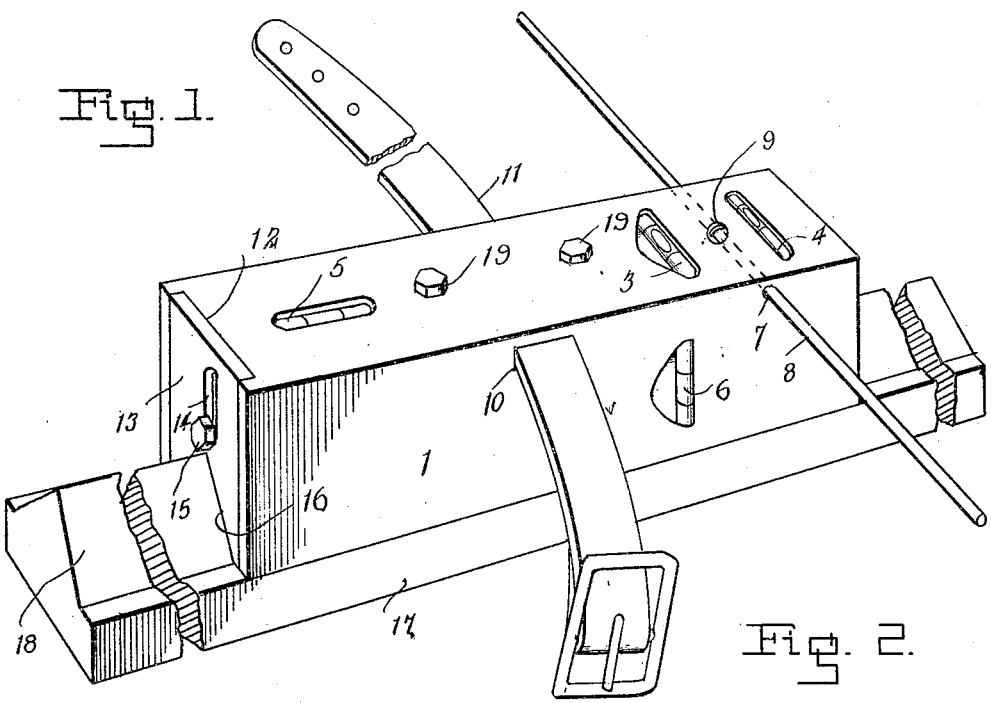
Figure 1 is a perspective view of the device, showing it attached to the base bar.

The device comprises a body 1 of oblong formation, said body having a longitudinally extending V-shaped groove 2 formed in one face thereof. The body has mounted in one face thereof transversely arranged spirit levels 3 and 4, and in this same face is mounted a longitudinally extending spirit level 5. A similar level 6 is mounted in another face of the body and is disposed transversely thereof in order that it will be arranged at right angles to the aforementioned spirit levels.

A transverse opening 7 is formed in the body and in which is engaged the gauge rod 8, said rod being maintained in adjusted position by a set screw 9.

The body is further provided with a transverse slot 10 in which is engaged a strap 11, the purpose of which will be later explained.

One end of the body is provided with a recess 12 in which is slidably mounted a gauge plate 13, said plate having a slot 14 therein for accommodating the set screw 15, said screw being threaded in the end of the body and serving to hold the plates in adjusted position. This plate has one end formed with a V-shaped recess 16, the purpose of which will be later explained.

Figure 3:
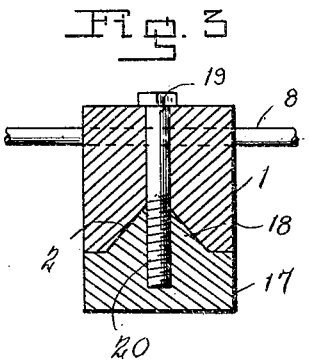
Figure 3 is a transverse sectional view taken through Figure 1.
Figure 4:
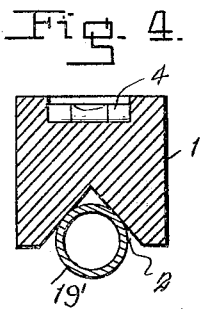
Figure 4 is a sectional view on line 4—4 of Figure 2.

The body 1 is designed to be used in some instances in connection with a base bar 17, said bar having a V-shaped rib 18 extending longitudinally thereof which is adapted to snugly engage the groove 2, of the body, as shown in Figures 1 and 3 of the drawings.

In order to hold the body firmly connected with the base bar a pair of bolts 19 are provided which pass through the body and engage in the sockets 20 formed in the said bar.

As shown in Figure 1, the body is attached to the base bar 17, and when thus connected the level is used for determining the plane or level of comparatively large objects, such for instance, as machine beds, grinding tables, columns or the like. When the level is to be used for determining the plumb and level of comparatively small objects, the body is removed from the base bar 17.

Figure 2:
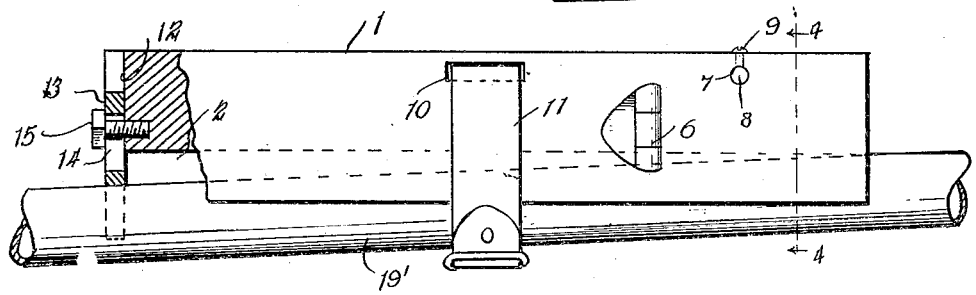
Figure 2 is a side elevation of the device, removed from the base bar, and showing the position assumed when determining the drop of a pipe or shaft.

As shown in Figure 2, the body is used separately from the base bar, and as thus shown is used for determining the drops in pipes or the like. Obviously the gauge plate 13 is adjusted to the proper degree and the level placed upon the pipe 19', and at which time the plate 13 and remote end of the body 1 will engage the pipe. When the bubble of the spirit level 5 is centered the necessary drop will be properly indicated. Owing to the presence of the plate 13 the level can be used for determining the pitch of roofs and rafters.

To use the level for leveling shafts it is only necessary to place the same upon the shaft, and at which time the spirit level 5 will indicate the position thereof. The gauge rod 8 is capable of being adjusted for paralleling a plurality of shafts or pipes.

When the level is used for plumbing vertically disposed shafts or staffs, the strap 11 may be engaged upon the shaft or staff to hold the level in place. When used thus, the spirit levels 3 and 6 will indicate the proper position of the shaft or staff, since the spirit levels will denote the incline of the object in various directions, it being obvious that when the levels of both spirit levels are centered the object will be in proper plumb.

From the foregoing, it is thought that the construction, operation and many advantages of the herein described invention will be apparent to those skilled in the art, without further description, and it will be understood that various changes in the size, shape, and proportion and minor details of construction may be resorted to without departing from the spirit or sacrificing any of the advantages of the invention.

What is claimed is:—

An instrument of the class described comprising an elongated body having a V-shaped groove formed therein, a base bar having a correspondingly shaped rib for engagement in said groove, said base bar being greater in length than the body, securing devices passable through the body and engageable with the rib, said body having a recess in one end, and a gage plate adjustably mounted in the recess and having a V-shaped notch to accommodate said rib.

In testimony whereof I affix my signature.

WALTER C. SHERWOOD. [L. S.]